Oct. 5, 1937.    J. DIECKMANN ET AL    2,094,877
COLLAPSIBLE TUBE
Filed May 22, 1934
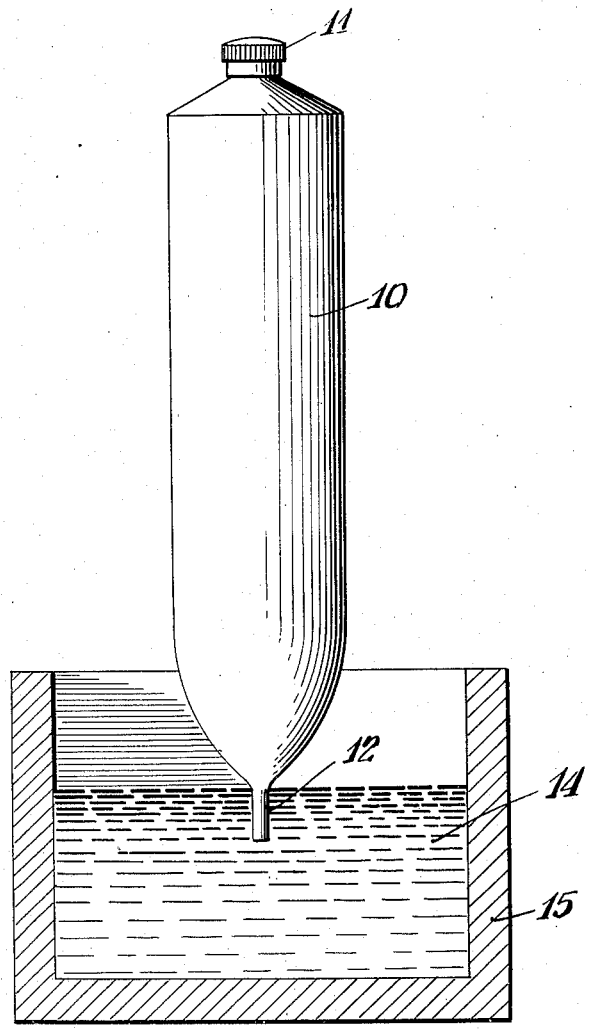
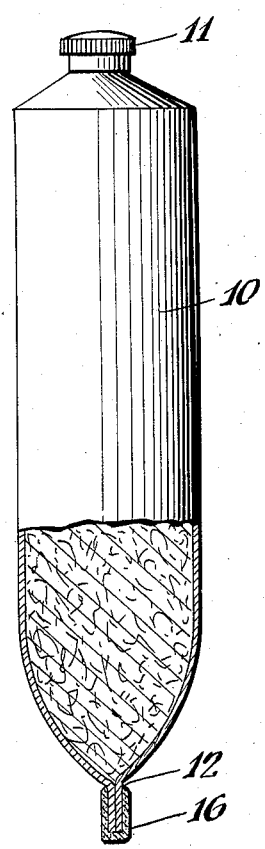
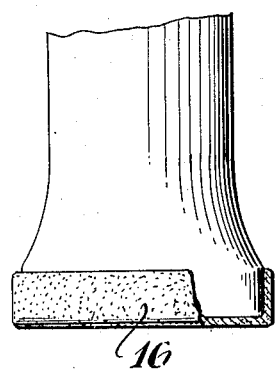
INVENTORS
JOHN DIECKMANN
HERBERT LODDE
BY WILLIAM J. ADAMS
ATTORNEY Patented Oct. 5, 1937

2,094,877

UNITED STATES PATENT OFFICE 2,094,877

COLLAPSIBLE TUBE

John Dieckmann, Herbert Lodde, and William J. Adams, New York, N. Y.

Application May 22, 1934, Serial No. 726,966

1 Claim. (Cl. 221—60)

Our invention relates to improvements in collapsible tubes, particularly to a method of making such tubes, after they have been filled, airtight for the conservation of their contents.

According to the known methods of closing such tubes which have the customary discharge opening closed by a cap, the open ends of these tubes are sealed by means brought into contact with the inner walls of the tube ends, thus producing a rather unsanitary closure, particularly when the tubes are used for packing food preparations.

It is the principal object of our invention to avoid such unsanitary tube closures, apt to contaminate the tube contents, by keeping the inner walls of the tube ends clean and thus preventing the contents of the tube from becoming impure by contact or admixture with the closing medium. With this end in view, we flatten and press the walls of the filled tube firmly together and then dip or immerse the end into a solder bath of suitable consistency covering the outer walls of the tube only.

Another object of our invention is the provision of a collapsible tube closure presenting an airtight receptacle for the tube contents which then may be sterilized to destroy bacteria and germs to keep the tube contents intact and palatable for a considerable time.

A further object of our invention is the provision of a method for closing collapsible tubes in a sanitary and airtight manner which moreover is simple and inexpensive yet durable and highly efficient in practice.

These and other objects of our invention will become more fully known as the description thereof proceeds and will then be specifically defined in the appended claim.

In the accompanying drawing forming a material part of this disclosure:

Fig. 1 is an elevation of a collapsible tube having its compresed filler end constructed according to our invention and inserted into a solder bath.

Fig. 2 illustrates the finished tube, partly in section.

Fig. 3 is a fragmentary side elevation of the lower end of the tube constructed according to our invention, with the solder deposit partly in section.

As illustrated, the collapsible tube 10 comprises a cap 11 closing its discharge end. The filler end 12 is compressed tightly and is dipped or immersed into a solder bath 14 in a container 15, and the solder deposit is designated 16.

According to our method the collapsible tubes, as they can be bought in the open market equipped with a cap closing their discharge openings, are filled with the selected contents, as for instance caviar or anchovy paste for which we preferably intend to use the tubes, although we do not desire to be restricted to such exclusive use, and may fill the tubes with other suitable desirable plastic substances to be dispensed therefrom.

Then the inner walls of the tube ends are scrupulously cleaned, flattened and compressed, and firmly dipped or immersed into a solder bath adhering to its outer walls until the opening is tightly closed. Therefore the contents may be sterilized by heating to preserve the same.

We may use any suitable apparatus for the dipping process by means of which a plurality of tubes may be closed at one time and we may use any solder of suitable consistency.

We may also further seal the tube by crimping and folding the flattened portions over upon themselves and holding the crimped parts by means of the usual clips.

It will be understood that we have described the preferred way of practically carrying out our invention as an example only of the many possible ways to practice the same, and that we may make such changes in the manner and steps of executing our method as come within the scope of the appended claim without departure from the spirit of our invention and the principles involved.

Having thus described our invention, what we claim as new and desire to secure by Letters Patent is:

As an article of manufacture a collapsible tube comprising a cap closed discharge end, a flattened compressed filler end and a solder deposit on the outer walls of said filler end to produce an airtight and sanitary closure for said tube.

JOHN DIECKMANN.
HERBERT LODDE.
W. J. ADAMS.